United States Patent

[11] 3,591,730

[72] Inventor Daniel C. Chang
1 Roosevelt Road, Sec. 1,
Taipei, Taiwan, China

[21] Appl. No. 702,014
[22] Filed Jan. 31, 1968
[45] Patented July 6, 1971

[54] AMPLITUDE SENSITIVE MAGNETIC MARKING AND SELF-MUTING MARK SENSING SYSTEM
9 Claims, 1 Drawing Fig.

[52] U.S. Cl. 179/100.2
[51] Int. Cl. G11b 15/06
[50] Field of Search 179/100.2 S, 100.2 MD

[56] References Cited

UNITED STATES PATENTS

| | | | |
|---|---|---|---|
| 2,932,696 | 4/1960 | Shipman | 179/100.2 |
| 3,475,564 | 10/1969 | Lindgren et al. | 179/100.2 |
| 2,827,515 | 3/1958 | Zuber | 179/6 |
| 2,878,321 | 3/1959 | Davis | 179/100.2 |
| 2,900,132 | 8/1959 | Burns et al. | 179/100.2 |
| 3,296,385 | 1/1967 | Shaw | 179/100.2 |
| 3,334,194 | 8/1967 | Chang | 179/100.2 |

*Primary Examiner*—Bernard Konick
*Assistant Examiner*—Robert S. Tupper
*Attorneys*—A. Yates Dowell and A. Yates Dowell, Jr.

ABSTRACT: A record receiving medium is provided with saturated magnetic markings to serve as control signals for a record recorder and reproducer. The record recorder and reproducer is provided with means to mute the output of the reproducer at the time the control signals are received.

PATENTED JUL 6 1971 3,591,730
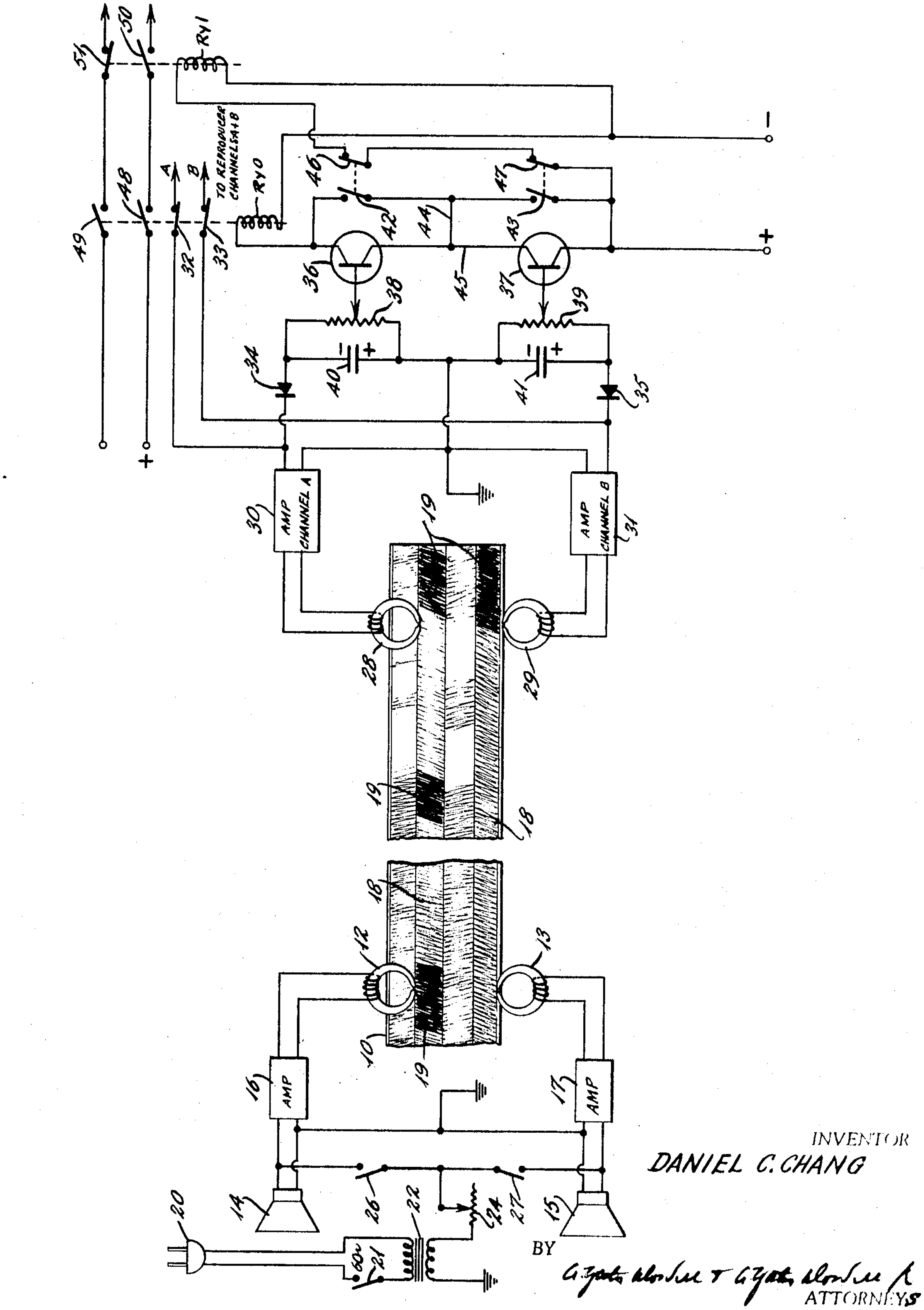
INVENTOR
DANIEL C. CHANG
BY
[signature]
ATTORNEYS

AMPLITUDE SENSITIVE MAGNETIC MARKING AND SELF-MUTING MARK SENSING SYSTEM

This invention relates to magnetic tapes or equivalent media for use in magnetic recorders and reproducers. More specifically the invention relates to markings on such magnetic media to control operating functions of equipment with which the medium is to be used.

In the prior art various types of indications on tapes have been used for controlling tape transport or other functions. Examples of such indications are perforations in the tape to be sensed photoelectrically and magnetic markings on the tape to be sensed by a magnetic pickup head.

For various reasons, it is deemed that the use of magnetic control markings on a tape recommends itself to the user of magnetic tape recorders and reproducers. Among these reasons may be mentioned the ease of application of the marks to the tape and the erasure thereof and, further, the avoidance of utilizing much more equipment than that which already exists in the machine.

However, with prior art devices, it is found that the magnetic markings placed on the tape were ineffective during fast tape transport in advancing from one section of the tape to another. This is because the signals applied to the tape were of a low order of intensity, as at about 0 db. and usually applied by a current at subsonic frequency, as at 20 Hz. or at supersonic frequencies. Since all of these magnetic markings are frequency sensed devices, they can not work on high-speed winding since the frequency changes with the speed of the tape.

It is an object of this invention to provide magnetic signals on a magnetic tape of such a frequency and strength as to insure the signals being properly sensed by a pickup head during fast tape transport movement.

It is a further object of the invention to provide a tape with magnetic markings thereon of high saturation, these markings being provided for control operations in a reproducer, these markings being applied either as a step in the process of manufacture of the tape or after mounting the tape in a recording and reproducing instrumentality.

It is yet a further object of the invention, and as a modification of the invention, to apply a multiplicity of marks of magnetic saturation to a tape, which marks must be simultaneously sensed to enable a selected one of a number of control functions to be effected.

Still further, it is an object of this invention to mute the output channel of a magnetic reproducer during the time that the magnetic control markings are sensed.

How these and other objects are accomplished will be made clear upon a consideration of the following specification, when taken in conjunction with the accompanying drawing in which the single FIGURE diagrammatically illustrates a preferred form of the invention. In said FIGURE the reference character 10 indicates a magnetically coated tape here shown as being of a two-track width. The upper portion or upper track of the band is reserved for receiving the program material and also for certain control function magnetic markings, while the lower portion or lower track of the tape is reserved for receiving a second program material and/or for magnetic markings for exercising control functions. It should be understood that the tape of the FIGURE is a preferred form of tape of the invention; the tape could be a steel wire or other magnetic marking receiving medium or tapes with other than two tracks, or a tape wherein program material is made in only one track, while both program material and control function magnetic markings are made in the other track, all as defined within the limits of the appended claims. The nature of the control markings is such, as will be pointed out, to be distinguishable by apparatus associated with the reproducer so that these markings would be responded to by other mechanisms than that which responds to the program material on the tape.

Cooperating with the tape are a number of magnetizing heads 12, 13, one for each track on the tape. These heads are of conventional character and are placed in contact with the tape along the track. Head 12 is connected to microphone or other pickup 14 while head 13 is connected to microphone or other pickup 15. Between head 12 and pickup 14 is an amplifier 16 and between head 13 and microphone 15 is an amplifier 17. The inputs 14 and 15 and their amplifiers create magnetic signals 18 in the tape which are recorded up to 0 db. recording level.

Also feeding the input to the amplifiers to create magnetic signal markings 19 on the tape at about the 10—12 db. level on reel to reel machines and about the 6 db. level on cassette machines and which will saturate the tape is the following mechanism: A plug 20 connectable to conventional house supply current, as at 50 Hz. or 60 Hz. 120 volts via a switch 21, feeds the primary of a transformer 22, the secondary of which, as at 6.3 volts, is connected via potentiometer 24 and switch 26 to the input of amplifier 16 and via the potentiometer 24 and switch 27 to the input of amplifier 17. Whenever the switch 21 is closed and one or both of switches 26, 27 likewise closed, saturated magnetic markings will be created in the tape. The markings 19 form an uninterrupted series of saturated magnetic areas along the length of the tape, the extent of the markings depending on low long the switches are held closed.

The reproduction of all of the magnetic markings is affected by pickup heads 28, 29 of conventional character and mechanism associated with the heads.

Pickup head 28 is connected to a channel A amplifier 30. Pickup head 29 is connected to a channel B amplifier 31. The output of amplifier 30 is fed via a normally closed relay controlled switch 32 to the mechanism of channel A. This may, for example, be a speaker or other output device. The output of amplifier 31 is fed via normally closed relay controlled switch 33 to the mechanism of channel B, which may be a second speaker or other output device. Another switch 49 on the same relay may be connected in series with a normally closed switch 51 on RY 1 to the sensing terminals 1 and 2 shown in the Change U.S. Pat. No. 3,334,194 to replace the conductive sensing means. The relay which controls the switches 32, 33 and 49 is identified as RY 0.

Amplifier 30 also, via diode 34, supplies negative potential to the base of PNP transistor 36 via a potentiometer 38 whose resistance element is bridged by a voltage stabilizing capacitor 40. Similarly, amplifier 31 feeds the base of PNP transistor 37 via diode 35, potentiometer 39 and associated capacitor 41. Obviously, the PNP transistors could be replaced by NPN types by reversing the polarities of the diodes 34 and 35. The transistors are connected in cascade, the coil of relay RY 0, with certain switches to be described open, being in series relationship with both transistors. The collector and emitter of transistor 36 are bridged by a switch 42 while the collector and emitter of transistor 37 are bridged by a switch 43. A tie line 44 is connected between the two switches 42 and 43 and to a point on a line 45 joining the emitter of transistor 36 with the collector of transistor 37. The relay coil circuit is supplied with a suitable current supply as 30-volt DC current. The direction of the current depends on the type of transistors utilized.

When the markings 19 are being sensed, it is possible to mute the reproducing mechanisms, or to perform any other function performed by the relay RY 0, the functioning being dependent on the positions of switches 42 and 43. With both switches open, relay RY 0 will be energized only when both transistors 36 and 37 are energized, i.e., when the markings 19 on the upper and lower tracks are coincidentally picked up by the heads 28 and 29. When switch 42 is closed, the relay RY 0 will be energized when only the markings 19 on the lower track are sensed. When switch 43 is closed, the relay RY 0 will be energized only when the markings 19 on the upper track are sensed. Thus, flexibility of operation of the apparatus is secured. Where the switches 32 and 33 are in series with the power feed to reproducer channels A and B, a muting of the reproducers will occur when any of the saturated markings are sensed, despite the muting device incorporated in Chang U.S. Pat. No. 3,334,194, since this is an independent mark sensing and self-muting device. The level of the signal at the base of each transistor is adjusted by the potentiometer so that program material signal markings 18 will be of insufficient voltage magnitude to turn the transistors on.

When both switches 42 and 43 are opened, a third function is under control of the markings on both tracks provided the markings on both tracks are sensed simultaneously. This is effected by the following mechanism: Associated for movement with the switch 42 is a second single pole switch 46 and associated for movement with switch 43 is a single pole switch 47. When switches 42 and 43 are open, switches 46 and 47 are closed. Switches 46 and 47 are connected in series with each other and in series with a relay RY 1, all across a source of power. The relay RY 0 besides the normally closed switches is provided with a third normally open switch 48 connected in series with a normally open switch 50 of relay RY 1. The line joining the two switches 48 and 50 may be in a control circuit to stop tape transport or to reverse it or to perform any other function associated with the tape.

When both switches 42 and 43 are opened so that it requires the simultaneous receipt of signals from the markings 19 in the two channels to effect energization of relay RY 0, the switches 46 and 47 are closed, energizing relay RY 1 and closing switch 50 to prime the third function control circuit and opening switch 51 to cut off the original control function. Then when two juxtaposed markings 19 are picked up by the two heads 28 and 29 simultaneously, relay RY 0 is energized closing normally open switch 48 and completing the circuit to effect the third control function.

While the invention has been described as a tape on which the markings 19 are placed therein by a head on the recorder and reproducing mechanism, it is obvious that such markings may be placed thereon during the course of manufacture of the tape, either with or without the lower voltage level recordings.

Although the term "saturated" has been used throughout the specification and claims, it has been used as a shorthand means for describing an orientation of the magnetic particles on the recording medium to a greater depth and density greatly in excess of that which is attained during emplacement of a program record such as a sound record on the medium so that the two types of markings can easily be differentiated by voltage sensitive devices rather than by frequency responsive devices.

What I claim is:

1. A recording and reproducing system for utilizing a magnetic tape having at least two tracks and for recording magnetic program material and a least one uninterrupted series of saturated amplitude sensitive magnetic markings to serve as control signals, said saturated markings and said program material being on the same track, said level of said saturated markings being at a higher level than said program material, said recording system comprising an amplifier, a record medium magnetizing head having a magnetizing coil serially connected to said amplifier, means associated with said head for feeding the coil of said head via the amplifier with a program translated electric current, further means associated with said amplifier for feeding the amplifier at will with alternating current at a voltage greatly in excess of the voltage of the translated electric current, and further comprises sensing, differentiating and control means, said latter means comprising a sensing head, an amplifier being serially connected thereto, the output of said amplifier being operatively connected via a diode feeding a potentiometer whose tap is connected to the base of a transistor, the emitter and collector of the transistor being operatively connected in series with a relay coil, switch contacts being operatively controlled by said coil and being normally closed and in series with said recording system, whereby a muting condition of said reproducing system will occur when said saturated markings are sensed.

2. A recording and reproducing system as set forth in claim 1 in which the AC voltage being fed to the amplifier is under the control of a potentiometer, and further the AC voltage is that of house mains at about 50 to 60 cycles per second, the house current being stepped down to a lower voltage by a stepdown transformer, said transformer being operatively connected across the house mains, and the means for controlling the AC current flow to the amplifier including a switch in the secondary of the transformer, said switch being operatively connected in series with the potentiometer and amplifier.

3. A recording and reproducing system as defined in claim 1, wherein the sensing head, amplifier diode, potentiometer and transistor are duplicated for each track, a switch bridging the emitter and collector of each transistor, said switches normally being in an open condition for the simultaneous sensing of the saturated markings, and with the closing of only one of the switches the saturated markings on one track are sensed, and with the closing of only the other of the switches the saturated markings on the other track are sensed, the collector of one of the transistors being connected via a conductor to the emitter of the other transistor and a connection between a point on the conductor and a point between the switches, and the relay being connected in series with the switches whereby a muting condition of said reproducing system will occur when said saturated markings are sensed.

4. In a reproducing system for utilizing a magnetic tape having at least two tracks and having recorded thereon a magnetic program material record and at least one uninterrupted series of saturated amplitude sensitive magnetic markings to serve as control signals, said saturated markings and said program material being on the same track, said level of said saturated markings being at a higher level than said program material, said reproducing system comprising individual means associated with each of said tracks for sensing said saturated markings and for differentiating between the magnetic program material record and the saturated magnetic markings and control means regulated by said combined sensing and differentiating means to render the output from the program material to become ineffective whenever the saturated markings are sensed.

5. A recording and reproducing system as set forth in claim 4 wherein said saturated markings are arranged in parallel with an additional series of saturated markings and spaced therefrom in the direction of the width of the medium and said two series of markings are directly opposite one another.

6. In a reproducing system as set forth in claim 4 wherein said combined means includes a reproducer head which picks up the magnetic program material record and saturated magnetic markings.

7. In a reproducing system as set forth in claim 6 wherein said control means includes a series connected diode, potentiometer and transistor, the output of the transistor being in series with a relay coil whose contact means open a circuit to the output of the reproducer; said coil is operable in a first condition whereby the saturated markings on one track are sensed in the system and further said coil is operable in a second condition whereby the saturated markings on the other track are sensed in the system.

8. In a reproducing system as set forth in claim 4 and further comprising individual first and second serially connected switch means associated with said combined sensing and differentiating means, said switch means normally being in an open condition for the simultaneous sensing of the saturated markings, and with the closing of only said first switch means the saturated markings on one track are sensed, and with the closing of only said second switch means the saturated markings on the other track are sensed, and said control means including additional switch means in operative position to perform the muting function during the simultaneous sensing operation.

9. In a reproducing system as set forth in claim 8, wherein a saturated mark sensed on one track being capable of operating one of said additional switch means and a saturated mark sensed on another track being capable of operating another one of said additional switch means, whereby the simultaneous opening of both said additional switch means will operate a third additional switch means.